United States Patent [19]
Bernhard et al.

[11] Patent Number: 5,596,883
[45] Date of Patent: Jan. 28, 1997

[54] LIGHT COMPONENT STRIPPING IN PLATE-FIN HEAT EXCHANGERS

[75] Inventors: Dennis P. Bernhard, Allentown; Howard C. Rowles, Center Valley, both of Pa.; Ramanathan R. Tarakad, Sugar Land, Tex.; John D. Bassett, Surbiton, Great Britain

[73] Assignee: Air Products and Chemicals, Inc., Allentown, Pa.

[21] Appl. No.: 538,540

[22] Filed: Oct. 3, 1995

[51] Int. Cl.$^6$ ........................................ F25J 3/00
[52] U.S. Cl. .................. 62/618; 62/903; 62/920; 62/932; 165/166
[58] Field of Search ............... 62/618, 903, 920, 62/932; 165/166

[56] References Cited

U.S. PATENT DOCUMENTS

| | | | |
|---|---|---|---|
| 2,944,966 | 7/1960 | Eickmeyer | 208/352 |
| 3,373,574 | 3/1968 | Fisher | 62/20 |
| 4,256,476 | 3/1981 | Van Baush | 62/23 |
| 4,272,269 | 6/1981 | Hammond et al. | 62/17 |
| 4,559,069 | 12/1985 | Becker | 62/11 |
| 4,666,483 | 5/1987 | Gauthier | 62/24 |
| 4,695,303 | 9/1987 | Montgomery, IV et al. | 62/24 |
| 4,698,081 | 10/1987 | Aghili | 62/24 |
| 4,710,214 | 12/1987 | Sharma et al. | 62/28 |
| 4,711,651 | 12/1987 | Sharma et al. | 62/34 |
| 4,714,487 | 12/1987 | Rowles | 62/24 |
| 4,726,826 | 2/1988 | Crawford et al. | 62/20 |
| 4,752,312 | 6/1988 | Prible | 62/25 |
| 4,854,955 | 8/1989 | Campbell | 62/24 |
| 4,881,960 | 11/1989 | Ranke et al. | 62/20 |
| 4,921,514 | 5/1990 | Rowles et al. | 62/24 |
| 4,952,305 | 8/1990 | Kummann | 208/340 |
| 4,966,612 | 10/1990 | Bauer | 62/24 |
| 5,275,005 | 1/1994 | Campbell et al. | 62/24 |
| 5,316,628 | 5/1994 | Collin et al. | 203/72 |
| 5,351,492 | 10/1994 | Agrawal et al. | 62/920 |
| 5,359,857 | 11/1994 | Honda | 62/920 |
| 5,461,870 | 10/1995 | Paradowski | 62/903 |

FOREIGN PATENT DOCUMENTS 2287528 9/1995 United Kingdom ............ B01D 3/26

OTHER PUBLICATIONS

Lehman, L. M., "Cryogenic Purification of Hydrogen", Energy Progress, vol. 3, No. 1, pp. 7–12 (Mar. 1983).

Primary Examiner—Ronald C. Capossela
Attorney, Agent, or Firm—John M. Fernbacher

[57] ABSTRACT

Light components are stripped from a multicomponent liquid feed mixture in a core type plate-fin heat exchanger by heating and partially vaporizing the mixture during downward flow in one of a plurality of multichannel flow passageways in the exchanger. The vapor thus formed flows upward and promotes vaporization of dissolved light components from the liquid to yield a liquid product substantially free of lighter components. The passageways are disposed in indirect heat exchange with one or more additional groups of passageways, and heat for partial vaporization of the downward-flowing liquid feed mixture is provided by indirect heat exchange with a condensing process stream. Alternatively, this heat is provided by a bottoms stream recovered from distillation of the stripped liquid product withdrawn from the core type plate-fin heat exchanger.

19 Claims, 2 Drawing Sheets

5,596,883

1

LIGHT COMPONENT STRIPPING IN PLATE-FIN HEAT EXCHANGERS

FIELD OF THE INVENTION

This invention relates to the low temperature separation of multicomponent mixtures and in particular to the utilization of light component stripping with vaporizing heat exchange in such a process.

BACKGROUND OF THE INVENTION

Mixtures of low-boiling gases are readily separated by phase change at cryogenic temperatures. One type of process for separating such mixtures is partial condensation in which a feed gas stream is cooled at a relatively high pressure to a temperature below the dew point of the mixture in order to condense a heavy fraction. The condensed liquid and the uncondensed vapors can be separately recovered as products. Typically, the condensed liquid fraction is rewarmed and at least partially revaporized, usually at a lower pressure. Such a process can provide high recovery of higher boiling components, but since there is no purification step the process cannot recover these products at high purity. Similarly, it is difficult to obtain good separation of lower boiling components if these are to be recovered. In order to increase the purity of recovered fractions, multiple warming zones and additional separators have been incorporated into the revaporization step, but this significantly increases the complexity of the process with only a small increase in product purity. Processes of this type have been suggested for the separation and recovery of $C_2^+$, $C_3^+$ or $C_4^+$ hydrocarbons.

Simple partial condensation processes have been described by L. M. Lehman in "Cryogenic Purification of Hydrogen", Energy Progress, Vol. 3, No. 1, pp 7–12 (March 1983) and in U.S. Pat. 4,559,069. More complex partial condensation processes utilizing multiple warming and separator steps in the revaporization of the heavier products especially $C_2^+$, $C_3^+$ or $C_4^+$ hydrocarbons, are described in U.S. Pat. Nos. 3,373,574; 4,256,476; and 4,726,826.

U.S. Pat. 2,994,966 discloses a method for separating hydrocarbon mixtures using a vertical shell-and-tube heat exchanger with internal baffle trays in which countercurrent liquid-vapor flow occurs with vaporization and stripping within the tubes and countercurrent liquid-vapor flow occurs with condensation and absorption on the outer surface of the tubes. Heat is exchanged across the tube walls while mass transfer occurs simultaneously inside and outside of the tubes. In another embodiment, a liquid is subcooled in upward flow which transfers heat through the wall to a region of countercurrent liquid-vapor flow in which vaporization and stripping occur simultaneously.

Higher boiling products can be recovered at higher purity by distillation in multi-stage distillation columns. While such a technique increases product purity, there is a large increase in the capital cost for the distillation column and related equipment such as reboilers, condensers, reflux drums and pumps. U.S. Pat. Nos. 4,695,303, 4,698,081, and 5,275,005 describe the incorporation of de-methanizer distillation columns for the production of relatively high purity $C_2^+$ product streams. Similarly, processes with de-ethanizer columns to produce high purity $C_3^+$ product streams are described in U.S. Pat. Nos. 4,666,483, 4,710,214, 4,711,651, 4,714,487, 4,752,312, 4,854,955, and 4,921,514.

2

Another approach to separating low-boiling gas mixtures is the lean oil absorption process in which a heavier hydrocarbon oil (the lean oil) is used to absorb $C_2^+$ and/or $C_3^+$ hydrocarbons from a feed gas. While such a process can provide a higher product recovery, it is generally more power intensive than processes which rely on partial condensation of the heavy, higher boiling hydrocarbons, since the absorbed $C_2^+$ and/or $C_3^+$ product components must subsequently be separated from the absorption oil fraction as well as from the co-absorbed light impurities. U.S. Pat. No. 4,272,269 describes one such process which utilizes a refrigerated $C_5$ absorption oil to scrub $C_3^+$ components from a natural gas feed. A similar process is suggested in U.S. Pat. No. 4,698,081, which describes a process wherein a $C_3$–$C_5$ hydrocarbon fraction is recirculated to the top of a demethanizer column as an absorption oil to increase the recovery of $C_2$ from a natural gas feed. Other scrubbing processes are described in U.S. Pat. Nos. 4,942,305, 4,881,960, and 4,966,612.

All of the techniques described above have common disadvantages. When it is desired to increase the recovery of the heavier, higher boiling components (e.g., $C_2$ and heavier hydrocarbons), more light components are condensed as impurities along with the additional quantities of the heavier components. This results in a lower product purity which may require additional separation and/or distillation equipment to remove the additional impurities and to produce a high purity product. Such additional equipment obviously increases the capital cost of the process.

The present invention addresses these problems by combining heat transfer and mass transfer in a single step in which a liquid stream is simultaneously heated and stripped of dissolved light impurities by indirect heat transfer from one or more cooling process streams. The stripped liquid stream can be separated further into individual high-purity products requiring no further process steps to remove lower-boiling impurities.

BRIEF DESCRIPTION OF THE INVENTION

The invention is a process for the separation of a liquid feed mixture comprising one or more heavier, higher-boiling components and one or more lighter, lower-boiling components in which the liquid feed mixture is introduced into a first group of vertical flow passageways having an upper end and a lower end wherein the passageways are disposed in indirect heat exchange with one or more additional groups of passageways in a heat exchange-mass transfer zone. The liquid feed mixture is passed into the upper end to flow downwardly through the first group of vertical flow passageways in which the downwardly-flowing liquid is warmed by indirect heat exchange with a condensing process fluid flowing in one of the additional groups of flow passageways, wherein the liquid is partially vaporized to form vapor which flows upwardly to provide a stripping medium in countercurrent flow to the downwardly flowing liquid. This promotes vaporization of lighter components from the liquid, thereby enriching the upwardly flowing vapor in the lighter components and enriching the downwardly flowing liquid in the heavier components. A vapor stream enriched in the lighter components is withdrawn from the upper end of said first group of passageways and a liquid product enriched in the heavier components is withdrawn from the lower end of the first group of passageways.

In one application of the invention, the heavier, higher-boiling components comprise hydrocarbons having two or more carbon atoms and lighter, lower-boiling components comprise methane. In another application, the lighter, lower-boiling components comprise one or more components selected from the group consisting of helium, hydrogen, nitrogen and carbon monoxide. Alternatively, the heavier, higher-boiling components comprise methane and the lighter, lower-boiling components comprise hydrogen and nitrogen. The method also is useful for separating a mixture containing methane, hydrogen, and carbon monoxide, wherein the liquid product is enriched in methane and carbon monoxide, and the vapor product is enriched in hydrogen and contains low concentrations of methane and carbon monoxide.

The condensing process fluid can be a partially condensing warm feed gas in indirect heat exchange with the vaporizing liquid feed, wherein the resulting partially condensed feed gas is separated into a first vapor and a first liquid, and the first liquid provides the liquid feed to the heat exchange-mass transfer zone. Alternatively, the resulting partially condensed feed is separated into a first vapor and a first liquid, the first liquid is reduced in pressure and separated into a second liquid and a second vapor, and the second liquid provides the liquid feed to the heat exchange-mass transfer zone. Alternatively, the reduced-pressure first liquid is combined with the vapor stream enriched in the lighter components which is withdrawn from the upper end of the first group of passageways. The combined stream is separated as earlier described into a second liquid and a second vapor.

Alternatively, the liquid feed mixture is obtained as a liquid product from a distillation column, a dephlegmator, or a refluxing condenser.

Further condensation of the warm feed gas can be provided by indirect heat exchange with a cold process stream flowing in another of the additional groups of flow passageways in the heat exchange-mass transfer zone; this cold process stream is provided at least in part by expanding the second vapor described above to a lower pressure. Alternatively, the cold process stream is provided by expanding a portion of the liquid product enriched in the heavier components to a lower pressure.

Optionally, an additional vapor stream is introduced into the lower end of the first group of vertical flow passageways wherein the additional vapor stream flows upward through the passageways and provides additional stripping medium in countercurrent flow to the downwardly flowing liquid, thereby promoting additional vaporization of lighter components from the liquid which further enriches the upwardly flowing vapor in the lighter components.

In another embodiment of the invention, the liquid product enriched in heavier components is separated in a distillation column into a vapor overhead stream and a liquid bottoms stream. At least a portion of the liquid bottoms stream provides a process fluid flowing in one of the additional groups of flow passageways to provide heat to the vaporizing liquid feed mixture flowing downwardly through the first group of vertical flow passageways. The liquid feed mixture to the heat exchange-mass transfer zone comprises methane and carbon monoxide as heavier, higher-boiling components and hydrogen as a lighter, lower-boiling component; the liquid bottoms stream from the distillation column is rich in methane.

Optionally, a stream of carbon monoxide vapor is introduced into the lower end of the first group of vertical flow passageways wherein the carbon monoxide stream flows upward through the passageways and provides additional stripping medium in countercurrent flow to the downwardly flowing liquid, thereby promoting additional vaporization of hydrogen from the liquid. Optionally, another stream of carbon monoxide vapor is partially condensed by indirect heat exchange with liquid in the bottom of the distillation column, thereby vaporizing a portion of the liquid to provide boilup vapor for the column, and passing the resulting stream of condensed carbon monoxide upwardly through another of the additional groups of flow passageways in the heat exchange-mass transfer zone to transfer additional heat into the liquid flowing downwardly through the group of vertical flow passageways.

The process of the present invention reduces capital cost and in most applications reduces power consumption compared with prior art methods for recovering $C_2$ and heavier hydrocarbons from refinery streams, removing dissolved helium, hydrogen, or nitrogen from heavier liquids, recovering hydrogen from hydrogen/hydrocarbon mixtures, and recovering hydrogen and carbon monoxide from synthesis gas.

DETAILED DESCRIPTION OF THE INVENTION

The basic concept of the invention is the simultaneous warming and stripping of a liquid feed mixture in a heat exchange-mass transfer device such as a plate-fin core type heat exchanger. Simultaneously one or more process streams are cooled by indirect heat exchange to provide heat for warming the liquid feed mixture. This concept is useful in many types of separations typically carried out at cryogenic temperatures for separating light hydrocarbon mixtures and mixtures containing low-boiling components such as hydrogen, helium, methane, nitrogen, and carbon monoxide.

Figure 1:
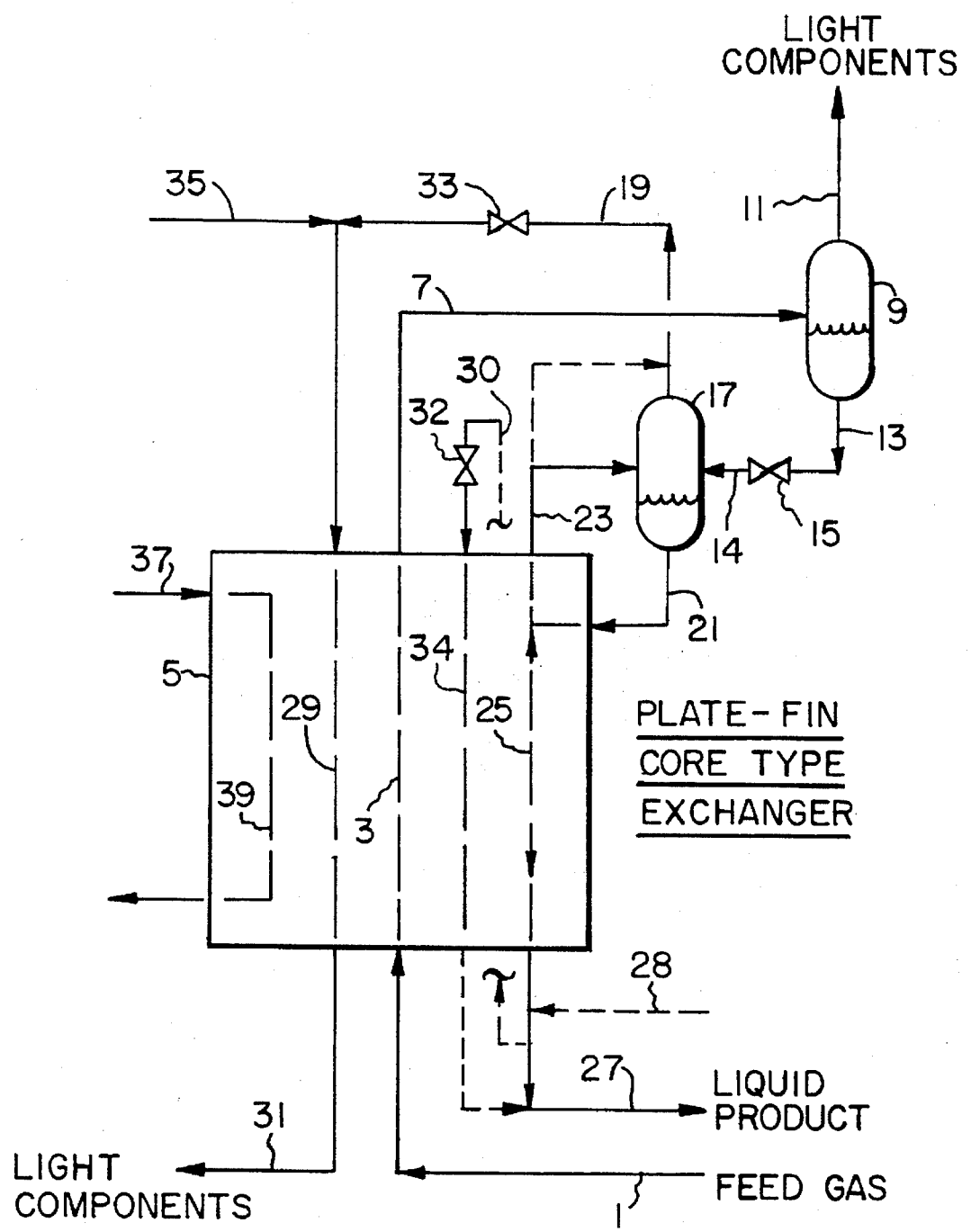
FIG. 1 is a schematic flowsheet of an embodiment of the present invention.

A first embodiment of the invention is illustrated in FIG. 1 for the separation of a mixture containing hydrogen, methane, and $C_2^+$ hydrocarbons. Feed gas 1 at 100 to 800 psia and near ambient temperature is cooled and partially condensed in circuit 3 of plate-fin core type heat exchanger 5 by indirect heat exchange with one or more warming process streams defined later. Partially condensed feed 7, typically at −50° to −175° F., is separated in separator 9 to yield vapor 11 containing most of the hydrogen and a large fraction of the methane in feed gas 1 and liquid 13 rich in $C_2^+$ hydrocarbons and containing some dissolved methane and hydrogen. Liquid 13 optionally is flashed across valve 15 and separated in separator 17 into vapor 19 which contains additional hydrogen and methane, and liquid 21 further enriched in $C_2^+$ hydrocarbons. Vapor 23 (later defined) may be introduced into separator 17 and leaves with vapor 19. Optionally, vapor 23 is combined directly with vapor 19. If liquid 13 is not flashed prior to separator 17, separator 9 is not used and partially condensed feed 7 is introduced directly into separator 17.

Liquid 21, which contains predominantly $C_2^+$ hydrocarbons with residual methane and hydrogen, is passed into and flows downward through stripping circuit 25 of plate-fin core type heat exchanger 5. As the liquid flows downward, heating and partial vaporization occur; the vapor rises as a stripping medium which promotes additional vaporization of lighter components such as methane and hydrogen. At least a portion of the heat to the downward-flowing liquid may be provided by indirect heat exchange with cooling feed gas in circuit 3. Liquid product 27, withdrawn from the bottom of stripping circuit 25, contains $C_2^+$ hydrocarbons and is essentially free of methane and hydrogen. Optionally, additional gas 28 is introduced at the bottom of stripping circuit 25 and flows upward to promote additional stripping of light components from the downward flowing liquid. Additional gas 28 can be any gas which promotes stripping and is compatible with the purity and recovery requirements of liquid product 27 or light components 19 and 31.

Additional cooling for condensation of feed gas 1 can be provided by warming vapor 19 in circuit 29 yielding warmed light components 31; optionally the pressure of vapor 19 can be reduced across valve 33. Optionally additional cold process gas 35, obtained from other step(s) operating in conjunction with the process of the present invention, can be combined with vapor 19 for warming in circuit 29. If necessary, additional refrigeration for feed cooling can be provided by refrigerant 37 flowing through circuit 39. Alternatively, additional refrigeration can be provided by withdrawing portion 30 of the effluent liquid product 27 from stripping circuit 25, reducing the pressure across valve 32 as necessary, and warming the stream in circuit 34.

Additional heat for warming the hydrocarbon liquid flowing downward in stripping circuit 25 can be provided as required by cooling other process streams in additional circuits (not shown) of plate-fin core type heat exchanger 5.

Plate-fin core-type heat exchanger 5 is a type of multiple circuit or multiple pass exchanger known in the cryogenic separation art. Each circuit or pass comprises multiple flow channels manifolded to distribute inlet fluid evenly to each flow channel and to withdraw outlet fluid evenly from each flow channel. The construction of the stripping circuit of the plate-fin exchanger used in the present invention is the same as that used in conventional plate-fin exchangers. The brazed aluminum plate-fin heat exchanger of the type commonly used in cryogenic service is well-suited for the present invention. Stainless steel and other metals suitable for cryogenic service also can be used. The use of a circuit for stripping service requires no major modifications to the exchanger and therefore no additional cost would be incurred. Stripping circuit 25 is oriented vertically and the other circuits also are generally oriented vertically. Warming and cooling streams preferably flow countercurrently in adjacent groups of flow channels.

Recovery of the desired hydrocarbon product can be adjusted by regulating the temperature of partially condensed feed 7. High recovery of a $C_2^+$ hydrocarbon product will require a lower temperature (e.g. about −150° F.) while recovery of a heavier $C_4^+$ product will require a higher temperature (e.g. about −25° F.). The purity of the $C_2^+$ hydrocarbon product (i.e. the concentration of residual lighter components) is determined by the design of stripping circuit 25 to provide the required number of effective separation stages and heat input. In general at least two and preferably three to twelve stages of separation will be required to provide satisfactory purity of the hydrocarbon product.

Optionally, a second feed cooling and vapor/liquid separation step with a separate flash separator and liquid stripping circuit (not shown) can be added using another circuit in plate-fin exchanger 5. Alternatively, a separate plate-fin exchanger can be used for the liquid stripping circuit. With this optional configuration, a product containing $C_4$ and heavier hydrocarbons can be recovered in the first separator and stripping circuit and a $C_2/C_3$ hydrocarbon product can be recovered in the second separator and stripping circuit.

Figure 2:
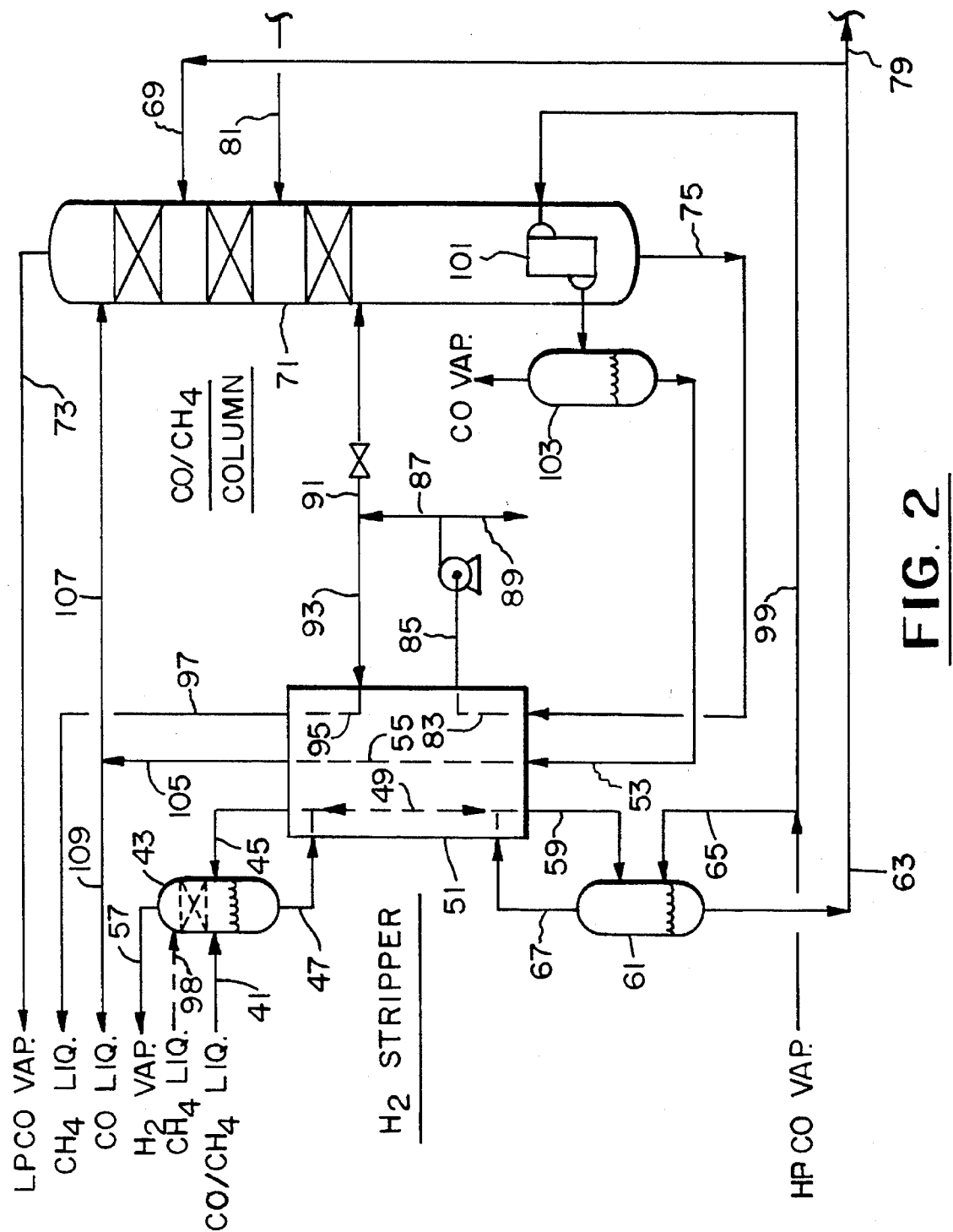
FIG. 2 is a schematic flowsheet of an alternative embodiment of the present invention.

The use of a plate-fin core type heat exchanger for stripping service as described above can be utilized in an alternative embodiment shown in FIG. 2. In this embodiment, the liquid product 63 enriched in heavier components which is withdrawn from the bottom of heat exchanger 51 is separated in a distillation column 71 into vapor overhead stream 73 and liquid bottoms stream 75. The liquid bottoms stream provides a warm process fluid in circuits 83 and 95 for vaporizing a portion of the feed liquid flowing downward in stripping circuit 49. This embodiment can be used for example in the separation of synthesis gas mixtures containing hydrogen, carbon monoxide, and methane, as described below to illustrate the embodiment. Other low-boiling mixtures also can be separated using this embodiment of the invention.

Referring now to FIG. 2, liquid feed stream 41 containing carbon monoxide and methane with up to 5 mole % dissolved hydrogen typically at 50 to 400 psia and −250° to −310° F. flows into separator 43 with vapor 45 (later defined) and liquid 47 flows into stripping circuit 49 of plate-fin core type heat exchanger 51. As liquid flows downward in stripping circuit 49, warm process stream 53 (later defined) flows upward in circuit 55 of the exchanger and cools while transferring heat to partially vaporize liquid in stripping circuit 49. The generated vapor in stripping circuit 49 flows upward and strips the liquid by promoting vaporization of dissolved hydrogen. Hydrogen-containing vapor 45, which may contain some entrained liquid, is introduced into separator 43 and hydrogen-rich vapor 57 is withdrawn therefrom.

Optionally, the upper portion of separator 43 can include a mass transfer zone containing packing or trays, and cold liquid methane 98 flows downward through this zone to absorb carbon monoxide and thus reduce the loss of carbon monoxide in hydrogen-rich stream 57.

Stripped liquid 59, which may contain some entrained vapor, flows into separator 61 and liquid carbon monoxide-methane product 63, which is essentially free of hydrogen, is withdrawn therefrom. Optionally carbon monoxide vapor 65 is introduced into separator 61, and vapor 67 withdrawn therefrom is introduced into stripping circuit 49 as an additional stripping medium to promote hydrogen vaporization from the downward-flowing liquid. As this additional stripping vapor moves upward and cools in stripping circuit 49, it will condense in the upper portion of the circuit and flow downward with the liquid therein, such that only a small amount of carbon monoxide is lost in hydrogen vapor stream 57.

Liquid 63 from separator 61 is introduced as liquid feed 69 into distillation column 71 for rectification into carbon monoxide vapor overhead 73 and liquid methane bottoms stream 75. Optionally, portion 79 of liquid 63 is warmed and partially vaporized in a heat exchange step (not shown), and is returned as vapor/liquid feed 81 to distillation column 71. Plate-fin core type heat exchanger 51 and distillation column 71 typically are integrated with a methane wash column and associated heat exchange steps (not shown). Liquid methane bottoms stream 75 passes through another circuit 83 in plate-fin core type heat exchanger 51 and provides additional heat to vaporize liquid in stripping circuit 49. Cooled liquid methane stream 85 is pressurized and split into streams 87 and 89; stream 89 can be used as fuel after warming. Stream 87 optionally is split into stream 91, which is reduced in pressure and returned to distillation column 71, and stream 93 which is further cooled in circuit 95 and withdrawn as liquid methane 97 which is introduced into a methane wash column (not shown) for absorbing carbon monoxide from hydrogen. Thus a portion of the process heat for the stripping of liquid in stripping circuit 49 is provided in an integrated fashion by heat from the bottom of distillation column 71 which separates the stripped liquid 63.

Additional heat can be transferred into the liquid in stripping circuit 49 by stream 53 as earlier described. High pressure carbon monoxide vapor stream 99 is partially condensed in reboiler 101 to provide vapor boilup in distillation column 71, and the partially condensed stream is separated in separator 103 to provide stream 53 as liquid carbon monoxide. Cooled carbon monoxide liquid 105 is returned in part as reflux 107 for distillation column 71 and the remainder 109 after further heat exchange (not shown) becomes a portion of the final carbon monoxide product.

This embodiment of the invention thus illustrates the use of an integrated heat exchange-mass transfer zone and a distillation step in which heat to promote stripping in the stripping circuit of the heat exchange-mass transfer zone is provided by fluids from the distillation step which separates the stripped liquid into product components. While the embodiment of FIG. 2 is illustrated above for the separation of hydrogen, carbon monoxide, and methane from synthesis gas, other low-boiling gas mixtures are amenable to separation by this method. Such separations include but are not limited to the rejection of nitrogen from natural gas and the recovery of helium from natural gas.

The present invention is distinguished over the prior art particularly by the methods of providing heat to the downward-flowing vaporizing liquid in the stripping circuit. In one embodiment, this heat is provided by indirect heat transfer with a condensing process fluid in an adjacent group of flow passageways, and the resulting partially condensed process fluid is separated to provide the liquid feed to the stripping circuit. In a version of this embodiment, the liquid feed is flashed to a lower pressure and separated from the resulting vapor before providing the liquid feed to the stripping circuit. In the alternative embodiment, heat for the downward-flowing vaporizing liquid is provided by indirect heat exchange with a liquid bottoms stream obtained by distillation of the stripped liquid product from the stripping circuit. Additional heat is provided by indirect heat transfer from another adjacent group of flow passageways containing another process liquid which previously supplied indirect heat to generate boilup vapor in the distillation of the stripped liquid product.

EXAMPLE 1

The embodiment of FIG. 1 is illustrated by a heat and mass balance according to the following Example. Feed gas 1 at 279 psia and ambient temperature contains hydrogen, methane, and $C_2$ to $C_5$ hydrocarbons in a typical hydrogen-rich refinery offgas. The stream is cooled to −80° F. and partially condenses in heat exchange circuit 3 of plate-fin heat exchanger 5. Partially condensed feed 7 is separated in separator 9, and the resulting liquid 13 is flashed across valve 15 to 56 psia and thereby cools to −86° F. Liquid 21 is withdrawn from separator 17 and flows downward in stripping circuit 25 which promotes evaporation of hydrogen, methane, and ethane into the vapor phase, which is withdrawn as vapor 23 and returned to separator 17. The system of FIG. 1 is operated as a de-ethanizer such that liquid product 27 contains $C_3$ and heavier hydrocarbons with a low concentration of $C_2$ and lighter components. Vapor streams 11 and 19 containing primarily hydrogen, methane, and ethane are withdrawn for further processing. Liquid product stream 27, containing 97 mole % of $C_3$ and heavier hydrocarbons and less than 1 ppmv methane and hydrogen, is withdrawn at 48° F. and 55 psia. Additional refrigeration for feed cooling is provided by external refrigerant 37 in circuit 39 and circuit 34 is not used. A stream summary for Example 1 is given in Table 1.

TABLE 1

STREAM SUMMARY FOR EXAMPLE 1

| | \multicolumn{6}{c}{Stream No. (FIG. 1)} | | | | | |
|---|---|---|---|---|---|---|
| | 1 | 13 | 14 (Liquid) | 14 (Vapor) | 23 | 27 |
| Lbmole/Hr | | | | | | |
| H2 | 4294.8 | 2.5 | 0.1 | 2.4 | 0.1 | 0.0 |
| C1 | 2483.6 | 23.5 | 9.6 | 13.9 | 9.6 | 0.0 |
| C2 | 500.6 | 81.7 | 77.0 | 4.7 | 70.4 | 6.6 |
| C3 | 173.1 | 105.0 | 104.3 | 0.7 | 14.8 | 89.5 |
| C4's | 56.4 | 50.5 | 50.4 | 0.1 | 1.3 | 49.1 |
| C5+ | 68.5 | 68.0 | 68.0 | 0.0 | 0.1 | 67.9 |
| TOTAL | 7577.0 | 331.2 | 309.4 | 21.8 | 96.3 | 213.1 |
| Mole % | | | | | | |
| H2 | 56.68 | 0.75 | 0.03 | 11.01 | 0.10 | 0.00 |
| C1 | 32.78 | 7.10 | 3.10 | 63.76 | 9.97 | 0.00 |
| C2 | 6.61 | 24.67 | 24.89 | 21.56 | 73.10 | 3.10 |
| C3 | 2.28 | 31.70 | 33.71 | 3.21 | 15.37 | 42.00 |
| C4's | 0.74 | 15.25 | 16.29 | 0.46 | 1.35 | 23.04 |
| C5+ | 0.90 | 20.53 | 21.98 | 0.00 | 0.10 | 31.86 |
| TOTAL | 100.00 | 100.00 | 100.00 | 100.00 | 100.00 | 100.00 |
| deg F | 60 | −80 | −86 | −86 | −28 | 48 |
| psia | 279 | 274 | 56 | 56 | 55 | 55 |

EXAMPLE 2

The present invention is further illustrated by another heat and mass balance according to the following Example in which the embodiment of FIG. 1 is operated as a de-methanizer to remove methane and lighter components and produce a $C_2^+$ product with low methane content in which high $C_2$ recovery is not required. Feed gas 1 at 279 psia and ambient temperature contains hydrogen, methane, and $C_2$ to $C_5^+$ hydrocarbons in a typical hydrogen-rich refinery offgas. The stream is cooled to −80° F. and partially condenses in heat exchange circuit 3. Partially condensed feed 7 is separated in separator 9, and the resulting liquid 13 is flashed across valve 15 to 55 psia and thereby cools to −86° F. This removes about half of the methane and lighter components in flash vapor 19. Liquid 21 is withdrawn from separator 17 and flows downward in stripping circuit 25 which promotes evaporation of hydrogen and methane into the vapor phase, which is withdrawn as vapor 23 and returned to separator 21. Vapor streams 11 and 19 containing primarily hydrogen and methane are withdrawn for optional further processing, such as recovery of the hydrogen in stream 11 and for subsequent refrigeration recovery.

Stripping circuit 25 of exchanger 5 is designed to provide sufficient heat input and stripping stages to remove essentially all of the remaining methane and lighter components from feed liquid 21. Liquid product stream 27, containing about 0.1 mole % methane and hydrogen, is withdrawn at −14° F. and 55 psia. In this Example, additional refrigeration for feed cooling is provided in circuit 39 and vapor stream 19 is mixed with light gas stream 35 returning from a hydrogen recovery section (not shown). A stream summary for Example 2 is given in Table 2.

TABLE 2

STREAM SUMMARY FOR EXAMPLE 2

| | | | Stream No. (FIG. 1) | | | |
|---|---|---|---|---|---|---|
| | 1 | 13 | 14 (Liquid) | 14 (Vapor) | 23 | 27 |
| Lbmole/Hr | | | | | | |
| H2 | 4294.8 | 2.5 | 0.1 | 2.4 | 0.1 | 0.0 |
| C1 | 2483.6 | 23.5 | 9.6 | 13.9 | 9.3 | 0.3 |
| C2 | 500.6 | 81.7 | 77.0 | 4.7 | 6.9 | 70.1 |
| C3 | 173.1 | 105.0 | 104.3 | 0.7 | 1.2 | 103.1 |
| C4's | 56.4 | 50.5 | 50.4 | 0.1 | 0.1 | 50.3 |
| C5+ | 68.5 | 68.0 | 68.0 | 0.0 | 0.0 | 68.0 |
| TOTAL | 7577.0 | 331.2 | 309.4 | 21.8 | 17.6 | 291.8 |
| Mole % | | | | | | |
| H2 | 56.68 | 0.75 | 0.03 | 11.01 | 0.57 | 0.00 |
| C1 | 32.78 | 7.10 | 3.10 | 63.76 | 52.84 | 0.10 |
| C2 | 6.61 | 24.67 | 24.89 | 21.56 | 39.20 | 24.02 |
| C3 | 2.28 | 31.70 | 33.71 | 3.21 | 6.82 | 35.33 |
| C4's | 0.74 | 15.25 | 16.29 | 0.46 | 0.57 | 17.24 |
| C5+ | 0.90 | 20.53 | 21.98 | 0.00 | 0.00 | 23.30 |
| TOTAL | 100.00 | 100.00 | 100.00 | 100.00 | 100.00 | 100.00 |
| deg F | 60 | −80 | −86 | −86 | −60 | −14 |
| psia | 279 | 274 | 56 | 56 | 55 | 55 |

EXAMPLE 3

A heat and mass balance was carried out according to the process of FIG. 2 for the separation of a stream containing primarily methane and carbon monoxide with a minor but significant amount of hydrogen. This feed stream 41 is separated to recover liquid 47 which is partially vaporized and stripped in stripping circuit 49. Carbon monoxide vapor 65 is introduced to promote the stripping in circuit 49, and hydrogen-rich stream 57 containing some carbon monoxide is recovered from separator 43. Stripped liquid 63, containing only 0.055 mole % hydrogen, is further separated in distillation column 71 to yield high purity carbon monoxide vapor 73 and liquid methane product 75. Heat for stripping circuit 49 is provided by cooling liquid methane 75 and liquid carbon monoxide 53. A summary of the heat and mass balance is given in Table 3.

TABLE 3

STREAM SUMMARY FOR EXAMPLE 3

| | Stream No. (FIG. 2) | | | | | | |
|---|---|---|---|---|---|---|---|
| | 41 | 53 | 57 | 63 | 65 | 75 | 93 |
| Flow, lb mol/hr | 3939 | 1209 | 256 | 3703 | 20 | 1134 | 1134 |
| Pressure, psia | 170 | 455 | 170 | 170 | 456 | 43 | 475 |
| Temperature, °F. | −288 | −227 | −285 | −245 | −214 | −232 | −237 |
| Composition, mol % | | | | | | | |
| $H_2$ | 4.6 | 0.1 | 70.3 | 0.1 | — | — | — |
| $N_2$ | 0.5 | 0.8 | 0.4 | 0.5 | — | — | — |
| CO | 56.1 | 98.8 | 27.7 | 58.3 | 100 | — | — |
| Ar | 0.1 | 0.2 | — | 0.1 | — | — | — |
| $CH_4$ | 37.5 | 0.1 | 1.6 | 39.7 | — | 97.6 | 97.6 |
| $C_2H_6$ | 1.2 | — | — | 1.3 | — | 2.4 | 2.4 |

The process of the present invention reduces the capital cost and in most cases is more energy efficient than prior art processes for the recovery of high purity $C_2^+$ hydrocarbon products from mixtures of such hydrocarbons with lighter components such as hydrogen and methane. It is possible to combine cooling of the feed stream, purification of the $C_2^+$ hydrocarbon product, warming of other process streams, and warming of refrigerant stream(s), if required, in a single heat exchange/mass transfer device. For any desirable level of product recovery, the invention can provide more stages of separation and much higher product purity than conventional partial condensation processes with a very small increase in equipment cost.

The process of the present invention allows significant capital cost savings over conventional distillation or lean oil absorption processes, which require additional equipment including columns, reboilers, condensers, drums, and pumps. Product purity and/or recovery can be increased with incremental changes in the design of the stripping circuit of the plate-fin core type heat exchanger, rather than these additional pieces of equipment.

The essential characteristics of the present invention are described completely in the foregoing disclosure. One skilled in the art can understand the invention and make various modifications thereto without departing from the basic spirit thereof, and without departing from the scope of the claims which follow.

We claim:

1. A process for the separation of a liquid feed mixture comprising one or more heavier, higher-boiling components and one or more lighter, lower-boiling components which comprises:

(a) introducing the liquid feed mixture into a first group of vertical flow passageways having an upper end and a lower end wherein said passageways are disposed in indirect heat exchange with one or more additional groups of passageways in a heat exchange-mass transfer zone;

(b) passing said liquid feed mixture into said upper end and downwardly through said first group of vertical flow passageways, and warming the liquid during downward flow by indirect heat exchange with a condensing process fluid flowing upwardly in one of said additional groups of flow passageways, wherein said liquid is partially vaporized to form vapor which flows upwardly in said first group of vertical flow passageways to provide a stripping medium in countercurrent flow to the downwardly flowing liquid and promotes vaporization of lighter components from the liquid, thereby enriching the upwardly flowing vapor in said lighter components and enriching the downwardly flowing liquid in said heavier components;

(c) withdrawing a vapor stream enriched in said lighter components from the upper end of said first group of passageways; and (d) withdrawing a liquid product enriched in said heavier components from the lower end of said first group of passageways.

2. The method of claim 1 wherein said heavier, higher-boiling components comprise hydrocarbons having two or more carbon atoms and said lighter, lower-boiling components comprise methane.

3. The method of claim 1 wherein said heavier, higher-boiling components comprise hydrocarbons having three or more carbon atoms and said lighter, lower-boiling components comprise methane and ethane.

4. The method of claim 1 wherein said lighter, lower-boiling components comprise one or more components selected from the group consisting of helium, hydrogen, nitrogen, and carbon monoxide.

5. The method of claim 1 wherein said heavier, higher-boiling components comprise methane and said lighter, lower-boiling components comprise hydrogen and nitrogen.

6. The method of claim 1 wherein said liquid feed comprises methane, hydrogen, and carbon monoxide, said liquid product is enriched in methane and carbon monoxide, and said vapor stream is enriched in hydrogen and contains lower concentrations of methane and carbon monoxide.

7. The method of claim 1 wherein said groups of vertical flow passageways are included in a core-type plate fin heat exchanger.

8. The method of claim 1 wherein said condensing process fluid is a feed gas which is partially condensed by indirect heat exchange with said vaporizing liquid feed in step (b), wherein the resulting partially condensed feed is separated into a first vapor and a first liquid, and wherein said first liquid provides said liquid feed to said heat exchange-mass transfer zone.

9. The method of claim 1 wherein said condensing process fluid is a feed gas which is partially condensed by indirect heat exchange with said vaporizing liquid feed in step (b), wherein the resulting partially condensed feed is separated into a first vapor and a first liquid, said first liquid is reduced in pressure and separated into a second liquid and a second vapor, and said second liquid provides said liquid feed to said heat exchange-mass transfer zone.

10. The method of claim 9 wherein said first liquid, after the pressure thereof is reduced, is combined with said vapor stream of step (c).

11. The method of claim 9 wherein said feed gas is further condensed by indirect heat exchange with a cold process stream flowing in another of said additional groups of flow passageways in said heat exchange-mass transfer zone, wherein said cold process stream is provided at least in part by expanding said second vapor to a lower pressure.

12. The method of claim 1 wherein said condensing process fluid is further condensed by indirect heat exchange with a cold process stream flowing in another of said additional groups of flow passageways in said heat exchange-mass transfer zone, wherein said cold process stream is provided by expanding a portion of said liquid product of step (d) to a lower pressure.

13. The process of claim 1 which further comprises introducing an additional vapor stream into the lower end of said first group of vertical flow passageways wherein the additional vapor stream flows upward through said passageways and provides additional stripping medium in countercurrent flow to the downwardly flowing liquid, thereby promoting additional vaporization of lighter components from the liquid which further enriches the upwardly flowing vapor in said lighter components.

14. The process of claim 1 wherein said liquid feed mixture is obtained as a liquid product from a distillation column, a dephlegmator, or a refluxing condenser.

15. A process for the separation of a liquid feed mixture comprising one or more heavier, higher-boiling components and one or more lighter, lower-boiling components which comprises:

(a) introducing the liquid feed mixture into a first group of vertical flow passageways having an upper end and a lower end wherein said passageways are disposed in indirect heat exchange with one or more additional groups of passageways in a heat exchange-mass transfer zone;

(b) passing said liquid feed mixture into said upper end and downwardly through said first group of vertical flow passageways, and warming the liquid during downward flow by indirect heat exchange with a process fluid flowing upwardly in one of said additional groups of flow passageways, wherein said liquid feed mixture is partially vaporized to form vapor which flows upwardly in said first group of vertical flow passageways to provide a stripping medium in countercurrent flow to the downwardly flowing liquid and promotes vaporization of lighter components from the liquid, thereby enriching the upwardly flowing vapor in said lighter components and enriching the downwardly flowing liquid in said heavier components;

(c) withdrawing a vapor stream enriched in said lighter components from the upper end of said first group of passageways; and (d) withdrawing a liquid product enriched in said heavier components from the lower end of said first group of passageways;

wherein said liquid product enriched in said heavier components of step (d) is separated in a distillation column into a vapor overhead stream and a liquid bottoms stream, and wherein at least a portion of said liquid bottoms stream provides said process fluid flowing upwardly in one of said additional groups of flow passageways in step (b).

16. The method of claim 15 wherein said liquid feed mixture comprises methane and carbon monoxide as heavier, higher-boiling components and hydrogen as a lighter, lower-boiling component, and wherein said liquid bottoms stream is rich in methane.

17. The method of claim 16 which further comprises obtaining a stream of carbon monoxide vapor and introducing a portion of the stream into the lower end of said first group of vertical flow passageways wherein the carbon monoxide stream flows upward through said passageways and provides additional stripping medium in countercurrent flow to the downwardly flowing liquid, thereby promoting additional vaporization of hydrogen from the liquid.

18. The method of claim 17 which further comprises cooling and at least partially condensing another portion of said stream of carbon monoxide vapor by indirect heat exchange with liquid in the bottom of said distillation column, thereby vaporizing a portion of said liquid to provide boilup vapor for said column, and passing the resulting stream of condensed carbon monoxide upwardly through another of said additional groups of flow passageways in said heat exchange-mass transfer zone to transfer additional heat into the liquid flowing downwardly through said first group of vertical flow passageways.

19. The method of claim 16 which further comprises contacting said vapor stream from the upper end of said first group of passageways with a stream of liquid methane which absorbs residual carbon monoxide from said vapor stream, and combining the resulting stream with said liquid feed mixture prior to introducing the liquid feed mixture into said first group of vertical flow passageways.

\* \* \* \* \*